(12) United States Patent
Adams et al.

(10) Patent No.: US 6,688,712 B2
(45) Date of Patent: Feb. 10, 2004

(54) DETACHABLE FRAME FOR COIL REMOVAL

(75) Inventors: John Carlisle Adams, Manchester, TN (US); Michael W. Austin, McMinnville, TN (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 09/969,417

(22) Filed: Oct. 2, 2001

(65) Prior Publication Data
US 2003/0011289 A1 Jan. 16, 2003

Related U.S. Application Data
(60) Provisional application No. 60/305,288, filed on Jul. 13, 2001.

(51) Int. Cl.[7] .............................................. A47B 47/00
(52) U.S. Cl. ................................ 312/265.1; 312/257.1; 211/191
(58) Field of Search ...................... 312/265.1, 265.2, 312/265.3, 265.4, 265.6, 257.1, 140, 108, 111; 211/26, 182, 186, 189, 191; 52/653.1, 653.2, 655.1

(56) References Cited

U.S. PATENT DOCUMENTS

| | | | | |
|---|---|---|---|---|
| 3,305,255 A | * | 2/1967 | Henderson | 403/219 |
| 3,724,678 A | * | 4/1973 | Challier | 211/191 |
| 3,871,525 A | * | 3/1975 | Al-Dabbagh et al. | 211/191 |
| 4,691,970 A | * | 9/1987 | Neri | 312/140 X |
| 4,782,637 A | * | 11/1988 | Eriksson et al. | 312/257.1 X |
| 5,228,762 A | * | 7/1993 | Mascrier | 312/265.1 X |
| 5,383,723 A | * | 1/1995 | Meyer | 312/265.4 |
| 5,713,651 A | * | 2/1998 | Essig et al. | 312/265.4 |
| 6,019,446 A | * | 2/2000 | Laboch et al. | 312/265.1 |
| 6,299,268 B1 | * | 10/2001 | Carle et al. | 312/265.1 X |

FOREIGN PATENT DOCUMENTS

| | | | |
|---|---|---|---|
| EP | 468597 | * | 1/1992 |
| GB | 2264165 | * | 8/1993 |
| WO | WO 99/13273 | * | 3/1999 |

* cited by examiner

Primary Examiner—James O. Hansen
(74) Attorney, Agent, or Firm—Wall Marjama & Bilinski LLP

(57) ABSTRACT

A modular unit forming a part of an air handling system unit being arranged to support a heat exchanger coil therein. The unit contains a three dimensional framework that includes one longitudinally extended beam that is removably connected at each end to opposed corners of spaced end frames. The framework contains spaces between adjacent beams that are closed by removable panels. Removing the beam and the adjacent panels allows ease of access to the coil as well as installation and removal of the coil from the modular unit.

13 Claims, 3 Drawing Sheets

DETACHABLE FRAME FOR COIL REMOVAL

CROSS-REFERENCE TO RELATED APPLICATION

This application claims the benefit of U.S. Provisional Application No. 60/305,288 filed on Jul. 13, 2001.

FIELD OF THE INVENTION

This invention relates generally to an air handling system and, in particular, to an air handling system having modular sections.

BACKGROUND OF THE INVENTION

More specifically, this invention relates to a modular section for an air handling system for housing an air conditioning component such as a heat exchanger coil for heating or cooling air that is being conducted through the air handling system. Some air handling systems are designed to allow the air conditioning coil to be removed from either the left or right side of the unit. This, however, places certain, oftentimes unwanted, limitations on the design of the system.

Due to installation limitations, this type of side access to the equipment is oftentimes denied and the coil must be removed through the top of the unit. This, in turn, requires the dismantling of a number of the air handling unit components to provide the necessary access to disconnect the coil from the air conditioning unit and raise the coil through the top opening. Current designs require the dismantling of the structure retainer of the modular unit that houses the coil as well as some of the related structural members. This procedure is not only time consuming but also poses a danger to the coil.

SUMMARY OF THE INVENTION is an object of the present invention to improve air handling systems, and, in particular, modular units of the system in which air handling equipment is housed.

It is a further object of the present invention to provide a modular section for an air handling unit that is capable of housing a heat exchanger coil and which can be easily accessed for installing and removing of the coil.

A still further object of the present invention is to provide ease of access to an air conditioner coil housed within an air handling unit.

Another object of the present invention is to reduce the amount of time needed to install or remove a piece of air handling equipment from a modular section of an air handling system.

These and other objects of the present invention are attained by a rectangular shaped three-dimensional modular section of an air handling system that is arranged to house related air handling equipment such as a heat exchanger coil. The modular section includes a structural framework having a pair of rectangular spaced-apart end frames that are cojoined by longitudinally extended beams that are attached at either end to the opposing corners of the spaced apart frames. The openings in the framework between the beams are closed by heat insulated removable panels. The two ends of each beam are equipped with an end cap that mates with a corner piece that joins a vertical leg of a frame to a horizontal leg. The end caps each have a hole with a recessed entrance that aligns with a threaded member carried in the mating corner piece. A threaded fastener is passed through the hole and threaded into the member thus securing both ends of the beam in the opposed end frames. Removal of the one longitudinally extended beam and the adjacent side wall panels provides extensive access to the coil housed within the module section.

BRIEF DESCRIPTION OF THE DRAWING

For a better understanding of these and other objects of the present invention, reference shall be made to the detailed description of the invention which is to be read in association with the accompanying drawings wherein.

DETAILED DESCRIPTION OF THE INVENTION

Figure 1:
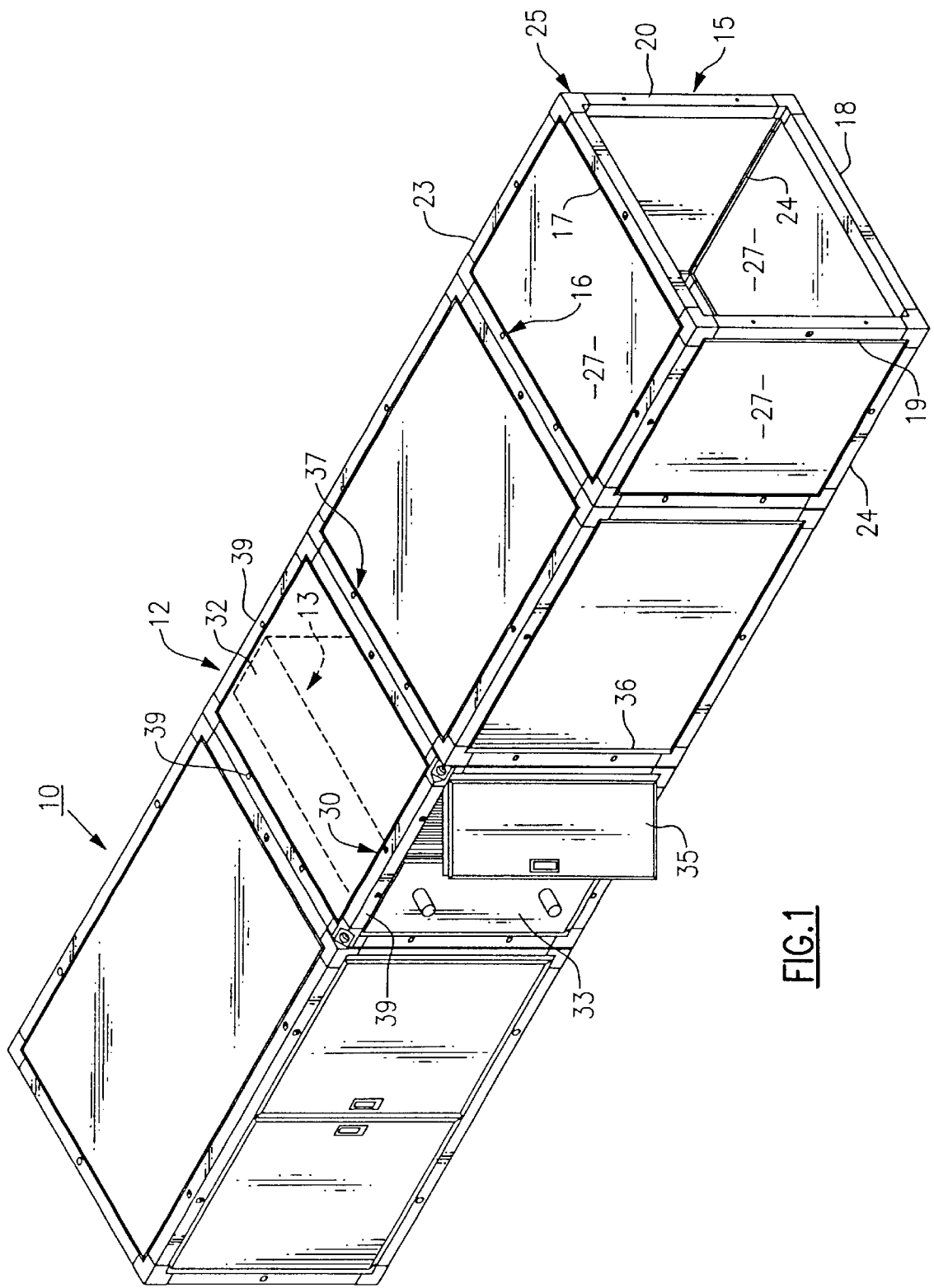
FIG. 1 is a perspective view illustrating a portion of an air handling unit containing a modular section that houses a heat exchanger coil and which embodies the teachings of the present invention.
Figure 2:
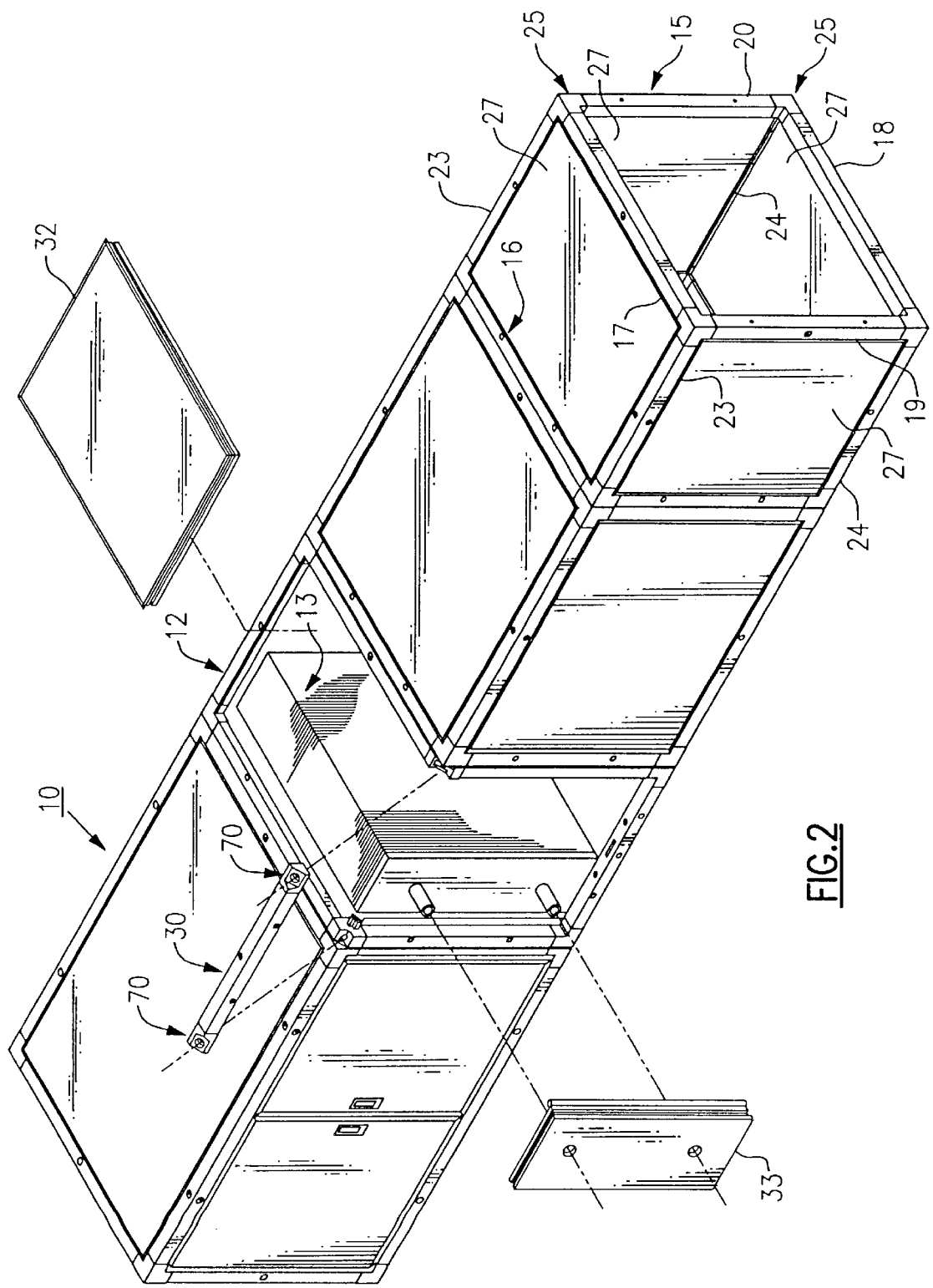
FIG. 2 is a partially exploded perspective view similar to FIG. 1 illustrating the modular section with one of the longitudinal beams and adjacent side panels exploded away from the unit.

Referring initially to FIGS. 1 and 2, there is illustrated a portion of an air handling system, generally referenced 10, that contains a series of three dimensional rectangularly shaped modular sections. The sections are assembled end to end to establish a system for conducting air along a desired path of travel. One of the modular sections 12 is arranged to house a heat exchanger coil 13 for conditioning the air as it moves through the system to either heat or cool the air. Each of the modular units includes two opposed similarly constructed end frames such as end frames 15 and 16 illustrated in FIGS. 1 and 2. Each end frame includes top and bottom rails 17 and 18, respectively, and a pair of side rails 19 and 20. The end frames, in turn, are interconnected at the four corners by longitudinally extended beams that include two upper beams 23—23 and two lower beams 24—24. The beams and the rails are all joined together where they meet at the corners by corner pieces 25—25. The corner pieces in each modular section are molded of a plastic material and contain three tubular receptors for slidably receiving the beams and rails therein. The beams and rails are held within the receptor by screws that pass through the receptor walls. Each beam and corner rail is fabricated from a square piece of hollow stock so that the rails and the beams have the same cross-sectional dimensions. The flat outside surfaces of the beams and rails in assembly, are placed in alignment with the sidewalls of the modular unit.

As can be seen, the end frames and beams come together to form a high strength skeletal framework having openings located between adjacent longitudinal beams. The openings are closed in assembly by insulated panels 27—27 that are arranged to minimize the passage of heat into or out of the modular units.

As noted above, it is not uncommon to mount equipment, such as the heat exchanger coil 13, illustrated in FIGS. 1 and 2, inside one of the modular units. Although the invention will be described with specific reference to a modular unit containing a heat exchanger coil, it should be evident that any type of equipment may be enclosed within the unit without departing from the teachings of the present invention. Typically, the coil will fill the entire width and height of the modular unit to best utilize the available space within the unit. Accordingly, there generally is not sufficient space available to slide the coil through the side of the framework even with the panels removed. As evidenced in FIG. 2, one of the upper longitudinal beams, which is generally reference 30, contained in the framework of the modular unit 12 that houses the coil, is adapted for rapid and easy removal from the unit along with the top panel 32 and a side panel 33.

As illustrated in FIG. 1, one side of the modular unit 12 includes a hinged door 35 to provide access to the coil for routine cleaning and maintenance of the coil. The door is hinged to one of the vertical rails of the unit's end frame 37 and is arranged to close against side panel 33 to render the joint between the door and side panel air tight. The side panel is provided with holes through which refrigerant lines to the coil pass out of the modular unit. The upper panel 32 and the side panel 33 are secured to the framework of the unit by screws 39 whereby the panel can be easily removed from the framework. Any other suitable fasteners however, may be used to secure the panels to the framework. The horizontal beam 30 which separates the two panels, prevents the coil from being removed laterally from the framework. As noted above, in many installations the entire modular unit housing the coil requires separation of the unit from the air handling system in order to permit sufficient dismantling of the framework so that the coil can be removed from the unit.

Figure 3:
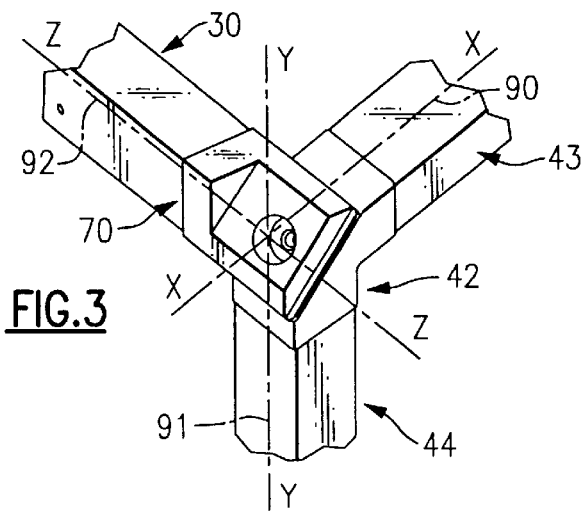
FIG. 3 is a partial perspective view showing one corner of the modular section framework wherein a vertical rail and a horizontal rail of an end frame are conjoined by a corner piece along with one end of a longitudinally extended beam of the modular section framework.
Figure 4:
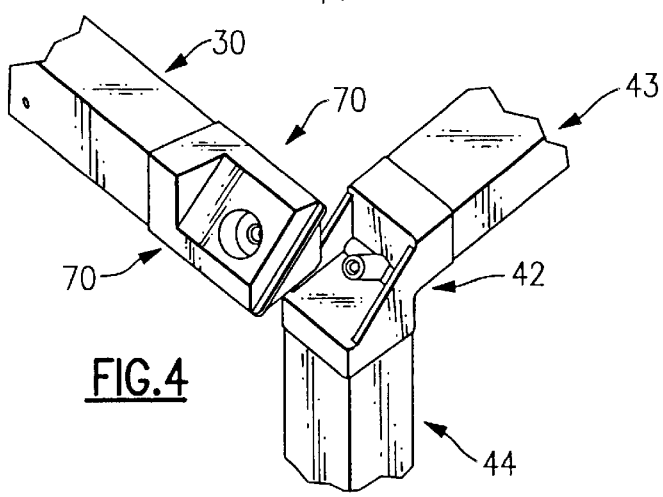
FIG. 4 is a perspective view similar to that illustrated in FIG. 3 showing the longitudinally extended beam removed from the corner piece.
Figure 5:
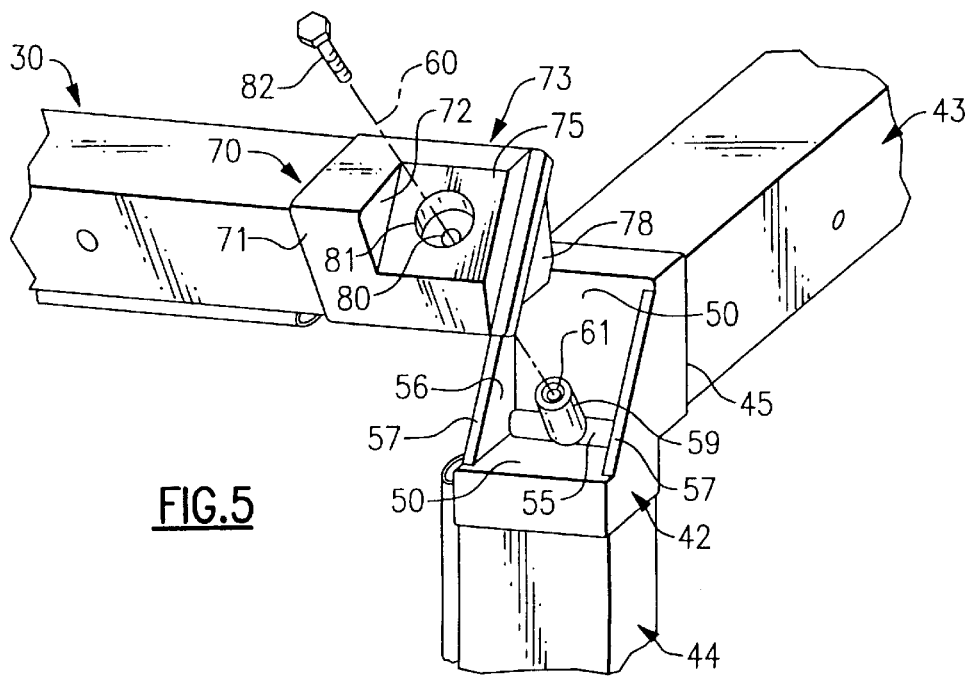
FIG. 5 is an enlarged perspective view showing further details of the corner piece.

With further reference to FIGS. 3–5, the longitudinal beam 30, is removably secured at both ends to special corner pieces 42 that serve to conjoin a horizontal rail 43 and a vertical rail 44 of each end frame of modular unit 12. Each corner piece 42 contains a first horizontal tubular compartment 45 and a second vertical tubular compartment that are rectangular in cross section and arranged to slidably receive the rail therein. Each compartment further contains an open front entrance and a back wall 50. The two back walls of the vertical and horizontal compartments are integrally joined along a common edge 55 and by two side wall partitions 56–56. The top edges 57 of the partitions form a 45° angle with the two back walls of the compartments. The horizontal rail 43 of each end frame is slidably contained within compartment 45 and the vertical rail 44 of each end frame is slidably contained within compartment 46.

Although not shown, each rail is secured to the receiving compartment by means of threaded fasteners. A cylindrical boss 59 is mounted in the space between the two side wall partitions. The boss has a centerline 60 that bisects the 90° angle formed by the two back walls of compartments 45 and 46. A threaded hole 61 is formed in the boss and is axially aligned with the centerline of the boss.

Each end of the longitudinal beam 30 is equipped with an end piece generally referenced 70 that includes a longitudinally extended compartment 71 which is open at one end so as to slidably receive one end of the beam therein. The opposite end of the compartment is closed by an end wall 72. An end cap 73 is integrally joined to the end wall 72 of the compartment 71. The end cap includes a cover section 75 that extends diagonally between the corners of the end wall 72 as best illustrated in FIG. 5. The bottom wall of the cover is equipped with a triangular shaped plug 78 which is arranged to fit snugly between the two side wall partitions of the corner pieces 42—42 when the cover section of the end cap is closed against the side wall partitions as illustrated in FIG. 3.

The cover section of the end cap contains a through hole 80 having an expanded recessed opening 81. The hole 80 at closure is axially aligned with the threaded hole 61 formed in the boss 59. A threaded fastener, such as bolt 82 is passed through the hole in each end piece and is threaded into the boss to draw the end pieces, and thus the longitudinal beam 30, tightly against the partitions 56 in each of the corner pieces 42. When the two end pieces 70 located at each end of the beam 30 are secured as explained above in the opposed corner pieces 42, the rail 43 will extend along a Y—Y axis 91 and the beam 30 will extend along a Z—Z axis 92, as illustrated in FIG. 3. As should be evident from the disclosure above, each of the axes are situated perpendicular to the other two axes.

As can be seen, the longitudinal beam 30 can be easily removed from the framework of the modular unit 12 along with the side panel 33 and the top panel 32 by simply removing the threaded fasteners that secure the parts to the framework. Clear access is thus provided to the heat exchanger coil 13. As a result, the coil can be readily worked upon while mounted within the modular unit or, alternatively, removed from the unit without the necessity of having to remove the modular unit housing the coil from the air handling system.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A modular unit for housing a heat exchanger coil within an air handling system, wherein said modular unit further includes a pair of spaced apart rectangular end frames that are connected at opposed corners by longitudinally extended tubular beams, one of said beams further having connected thereto an end piece having a first tubular receptor for slidably containing one end of said one beam and an end cap integrally joined to an end wall of said tubular receptor, and connecting means for removably joining said end cap to a corner member of an end frame wherein each end frame includes spaced apart horizontal tubular rails and vertical tubular rails, and further wherein said end piece is joined to a corner piece for connecting a horizontal rail to a vertical rail.

2. The modular unit of claim 1 that further includes side openings between adjacent beams, and side panels removably connected to said beams for closing said openings.

3. The modular unit of claim 2 that further includes threaded fasteners for removably joining said side panels to said beams.

4. The modular unit of claim 1 wherein said corner member includes a second tubular receptor for slidably receiving said horizontal rail therein and a third tubular receptor for slidably receiving said vertical rail therein, said first and second tubular receptors each having a rear wall.

5. The modular unit of claim 4 wherein said rear walls of the receptors are integrally joined by a pair of spaced apart partitions wherein said first and second tubular receptors are in perpendicular alignment.

6. The modular unit of claim 5 wherein said end cap is arranged to seat upon the top edge of said partitions and further includes fastening means for removably securing the end cap to an associated corner member.

7. The modular unit of claim 6 wherein each receptor is perpendicularly aligned with the other two receptors.

8. The modular unit of claim 7 wherein the beams and the rails each have a square cross section and each have the same height and width dimensions.

9. A modular unit for use in an air handling system, said unit containing equipment relating to the system and further includes:

a rectangular shaped three-dimensional framework having an X axis, a Y axis, and a Z axis, said framework containing a pair of opposed rectangular end frames, each having tubular side rails extending along an X axis and tubular bottom rails extending along a Y axis, and longitudinal tubular beams extending along a Z axis, each being connected at the opposite ends of the beam to opposing corners of the end frames, an end connector at each end of said removable beam for removably connecting the beam to opposing corners of the end frames, each end connector further including a first section connected to one corner of an end frame and a second section connected to one of said beams and which mates with said first section, and means for releasably securing the first section of each end connector to the second mating section of the end connector.

10. The modular unit of claim 9 wherein that further includes removable side panels connected to the framework between adjacent beams.

11. The modular unit of claim 9 wherein the first section of each end connector includes a first tubular receptor extending along the X axis for slidably receiving therein a side rail of an end frame and a second tubular receptor extending along the Y axis for therein a top or bottom rail of an end frame, said first and second tubular receptors each having a back wall and said back walls being conjoined by a pair of triangular shaped spaced apart partitions, each hawing parallel edges extending diagonally between the back walls of said first and second tubular receptors.

12. The modular unit of claim 11 wherein said first section further includes a cylindrical boss centered between the partitions having a female thread formed therein that has a central axis that is perpendicular to the plane described by said diagonal edges of the partitions.

13. The modular unit of claim 12 wherein each second section includes a third tubular receptor extending along the Z axis for slidably receiving one end of said beam therein, said third receptor further including an end wall and an end cap protruding outwardly from said third receptor end wall that is arranged to close against the top edges of said spaced apart partitions, and a threaded fastener passing through said end cap that is threaded to said central boss for releasing said first section to the second section.

* * * * *